(12) United States Patent
Casey

(10) Patent No.: US 10,287,737 B2
(45) Date of Patent: May 14, 2019

(54) SELF-CONTAINED PORTABLE DEVICE TO COLLECT ANIMAL WASTE

(71) Applicant: Lisa Elaine Casey, Lake Forest, CA (US)

(72) Inventor: Lisa Elaine Casey, Lake Forest, CA (US)

(*) Notice: Subject to any disclaimer, the term of this patent is extended or adjusted under 35 U.S.C. 154(b) by 0 days.

(21) Appl. No.: 15/892,993

(22) Filed: Feb. 9, 2018

(65) Prior Publication Data

US 2018/0179713 A1 Jun. 28, 2018

Related U.S. Application Data

(63) Continuation-in-part of application No. 15/283,336, filed on Oct. 1, 2016, now abandoned.

(51) Int. Cl.
*E01H 1/12* (2006.01)
*A01K 23/00* (2006.01)

(52) U.S. Cl.
CPC ......... *E01H 1/1206* (2013.01); *A01K 23/005* (2013.01); *E01H 2001/128* (2013.01); *E01H 2001/1226* (2013.01); *E01H 2001/1286* (2013.01)

(58) Field of Classification Search
CPC ............ E01H 1/1206; E01H 2001/128; E01H 2001/1226; A01K 23/005
USPC .................................................... 294/1.3, 1.4
See application file for complete search history.

(56) References Cited

U.S. PATENT DOCUMENTS

| | | |
|---|---|---|
| 3,370,787 A | 2/1968 | Lindholm |
| 4,368,907 A | 1/1983 | Ross |
| 4,741,566 A | 5/1988 | Byung-Do et al. |
| 5,320,393 A | 6/1994 | Cortinas |
| 5,702,138 A | 12/1997 | Elkind |
| 6,237,972 B1 | 5/2001 | Jung |
| 6,505,578 B1 | 1/2003 | Scott et al. |
| 6,641,188 B2 | 11/2003 | Arceo |
| 6,662,748 B1 * | 12/2003 | Hanks ................ A01K 1/0107 119/165 |
| 6,796,587 B2 | 9/2004 | Tsou |
| 7,093,869 B2 | 8/2006 | Jung |
| 7,226,098 B1 | 6/2007 | Moreira |
| 7,665,781 B2 * | 2/2010 | Drexler ................ E01H 1/1206 220/908 |
| 8,292,339 B1 | 10/2012 | Auseklis |
| 8,550,511 B2 * | 10/2013 | Baars ........................ E01H 1/12 294/1.3 |

(Continued)

*Primary Examiner* — Paul T Chin

(57) ABSTRACT

An animal waste collection device. An exemplary embodiment includes an elongated chassis defining a collection chamber having an open end, and a user-actuated pick up device with a movable shovel assembly mounted at the open end. The shovel assembly has a closed position for closing the open end, and an open position. A trap door is movable by the user between an opened position and a closed position located inside the collection chamber, to close the collection chamber in the closed position, and to open the collection chamber to entry of an animal waste specimen collected through the open end with the shovel assembly in the open position. Once the specimen is collected, the device may be inverted, the waste proceeding by gravity from the pick-up device, past the open trap door and into the collection chamber.

17 Claims, 11 Drawing Sheets

(56) References Cited

U.S. PATENT DOCUMENTS 9,428,873 B2 8/2016 Becattini, Jr. et al.
2012/0304406 A1* 12/2012 Kirby .................... E01H 1/1206
15/105

* cited by examiner

SELF-CONTAINED PORTABLE DEVICE TO COLLECT ANIMAL WASTE

CROSS-REFERENCE TO RELATED APPLICATION

This application is a continuation-in-part of U.S. application Ser. No. 15/283,336, filed Oct. 1, 2016, the entire contents of which are hereby incorporated by reference.

BACKGROUND

People love to take their dogs with them on long walks, hikes in the country or just to the mall for an outing. This is a wonderful experience for both dog and human, except for one thing. Dogs cannot be toilet trained! To date, the only means available to clean up an unexpected pet mess does not protect a person from the bacteria and aromas that come along with pet waste.

Aside from pretending your dog did not do it and walk away quickly, there is no expedient and sanitary solution for collection of the waste or for odor-free storage until it can be disposed of in an appropriate waste receptacle. Pet owners are required to carry the excrement, smelling its contents, until they can locate a trash receptacle. In some cases, that could be a very long walk.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
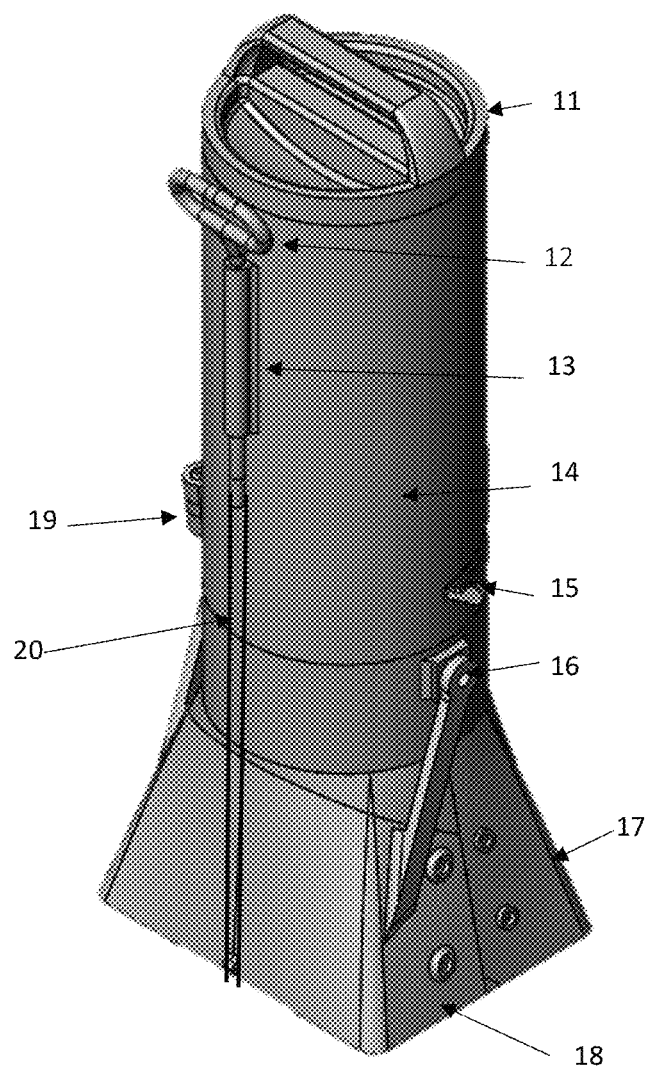
FIG. 1 is a schematic front-view illustration of an exemplary embodiment of an animal waste collection device including illustration of actuator assembly.

In the following detailed description and in the several figures of the drawing, like elements are identified with like reference numerals. The figures are not to scale, and relative feature sizes may be exaggerated for illustrative purposes.

An exemplary embodiment is a self-contained, portable device to collect multiple events of animal waste and store it inside a sealed chamber. The exemplary device has an elongated chamber with a pick-up claw or shovel assembly at one end. The claw or shovel assembly includes at least one movable piece, manipulated by a lever embedded in or attached to a chassis by a guide that runs along a molded handle mechanism. There is a trap door inside the chamber between the scoop/claw and the storage chamber. To use the device to collect a waste specimen, the specimen is covered by a small square of paper to protect the claw from contamination. Once the specimen is collected in the scoop/claw, the device is inverted. and the trap door manipulated by an external lever, causing the specimen to translate from the scoop, past the trap door and into an elongated bag inside the chamber. The bag assembly is inserted and removed from the clean end of the internal chamber. A trap door at the back side of the chassis allows for removal of the bag from the side of the chamber that has not come into contact with the animal waste specimen.

An exemplary embodiment of this device is particularly adapted for use by people who walk their dogs in areas where a trash receptacle is not immediately available to dispose of waste, or in a public area where it is imperative to remove the offending object quickly. The options available currently require close proximity of hands to the raw waste and provide no odor control. There are no products available that will collect multiple waste items for storage in a sealed internal unit. There are also no products that are small enough to be completely portable. An exemplary embodiment of the device not only keeps waste away from hands, it seals odors inside the device that can be carried unobtrusively in public.

Another benefit of this invention is that waste does not come in direct contact with hands during collection but is collected at some distance, e.g. on the order of 10 inches from the hands in one exemplary embodiment. An exemplary embodiment is a light-weight and portable storage system storing multiple instances of waste in a sanitary internal chamber. That number of instances depends on the size of the dog, but, in an exemplary embodiment, the storage chamber is large enough to store from six to fifteen depending on dog weight. This unit focuses on keeping waste away from hands and controlling odor in a sanitary, sealed unit.

Figure 2:
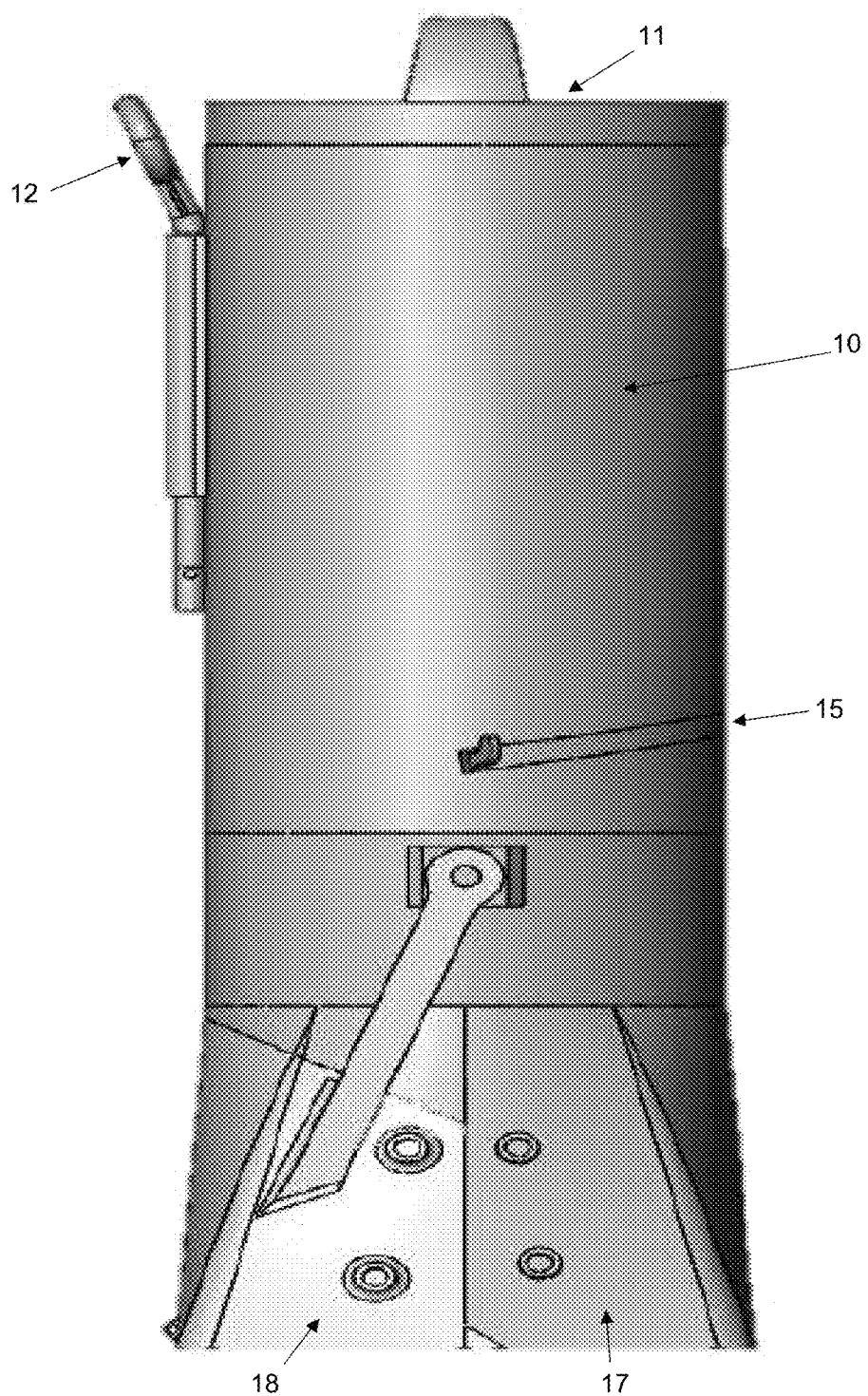
FIG. 2 is a schematic side-view illustration of the exemplary embodiment of the pick-up and collection device of FIG. 1.
Figure 3:
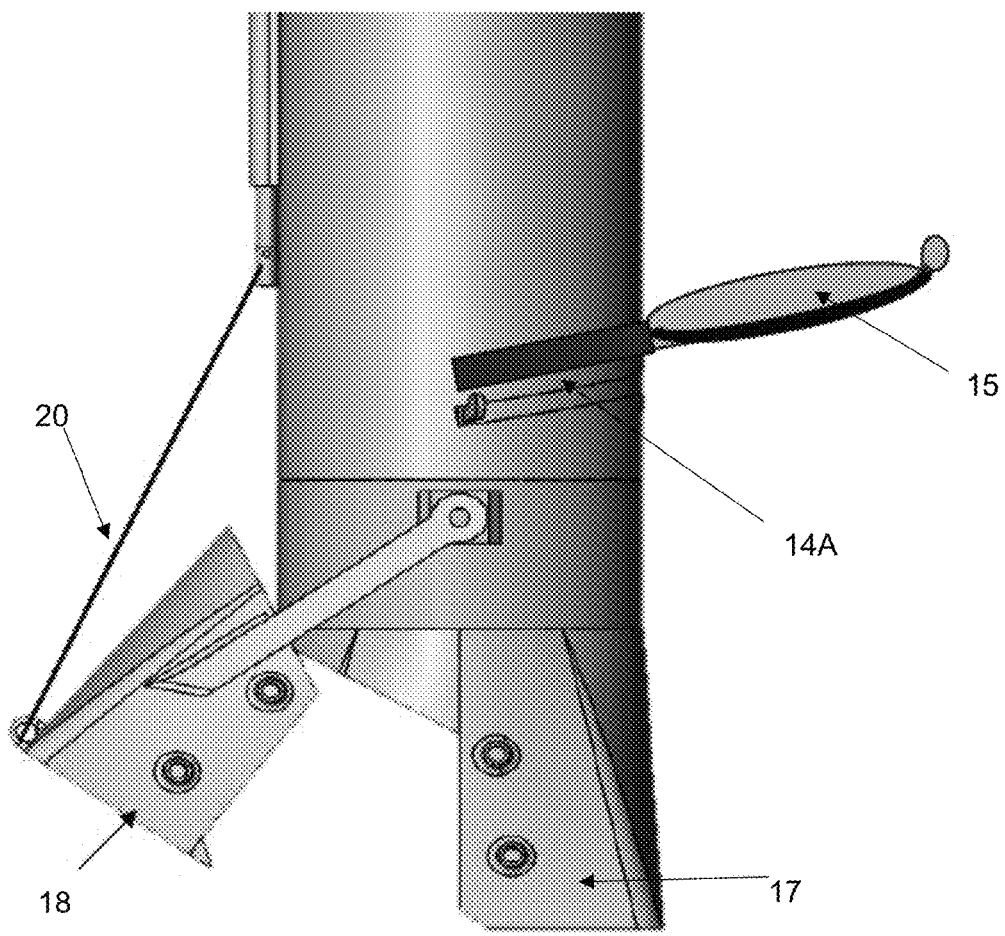
FIG. 3 is a schematic side-view illustration of the pick-up and collection device of FIG. 1 in an open position.
Figure 4:
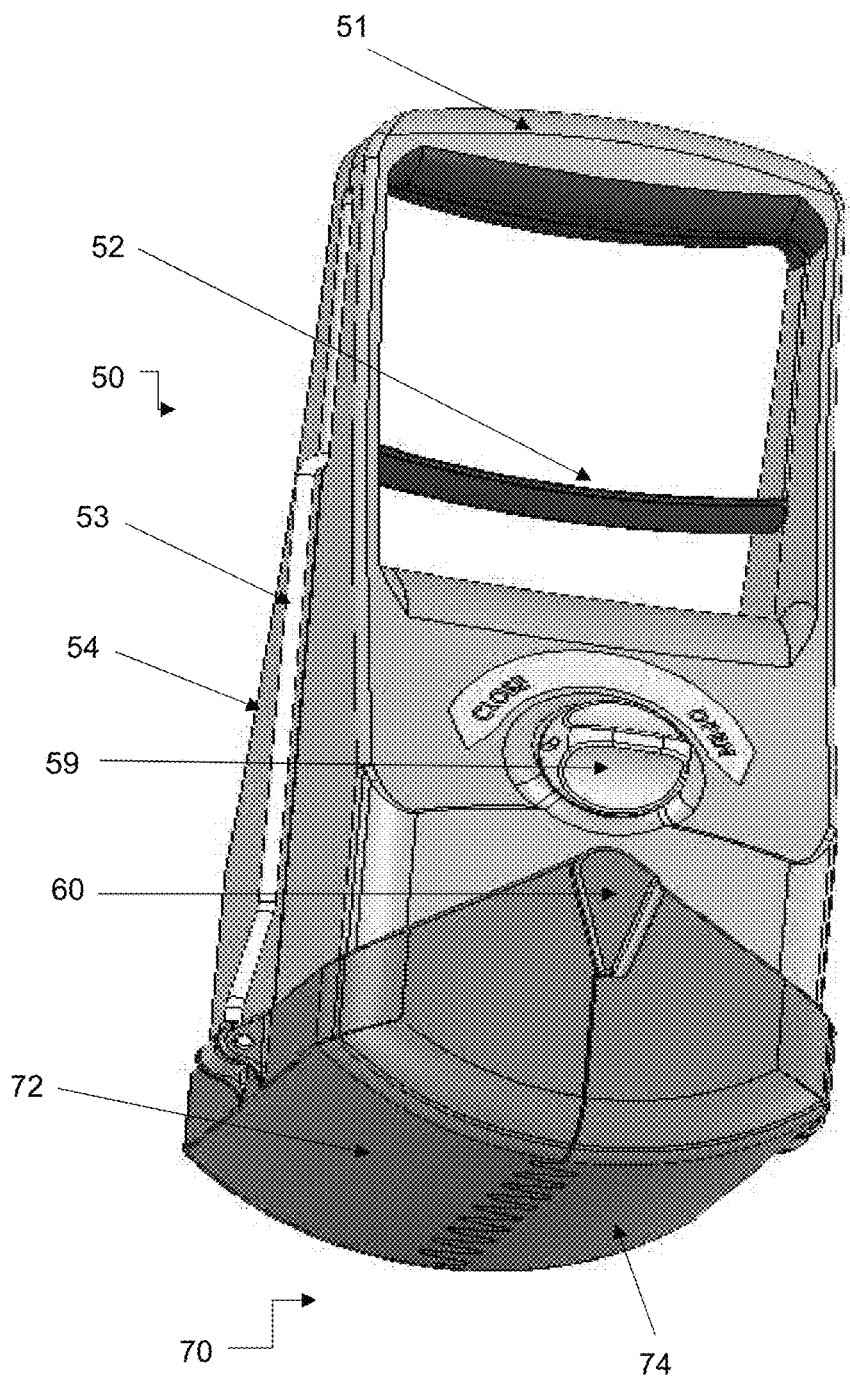
FIG. 4 is an isometric front view of an alternate embodiment of an animal waste collection device.
Figure 5:
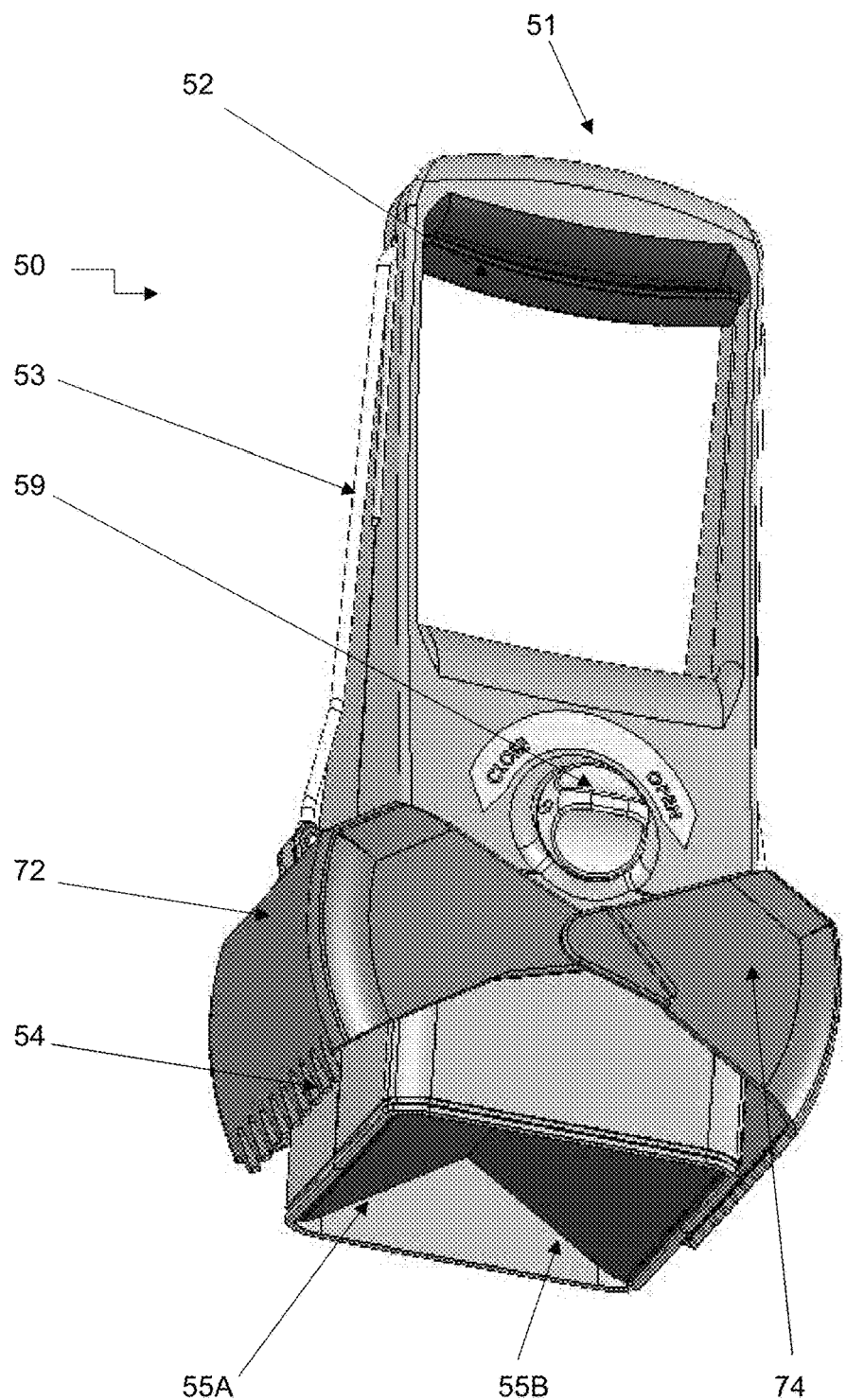
FIG. 5 is an illustration of the device of FIG. 4 in a "jaws open" position.

An exemplary embodiment of an animal waste collection device 10 is illustrated in FIGS. 1-3, and provides a clean, convenient device for collecting animal waste. The device 10 includes an elongated body or waste storage compartment 14, capped at the top with a removable carrying handle and cap 11. A disposable animal waste collection bag is installed inside the waste storage compartment, with its open end disposed at the collection end of the compartment. A two-part shovel assembly includes a movable shovel 18 and a static shovel 17.

The device 10 includes a hinged trap door 15 which may be pivoted or pulled outwardly through a slot 14A in the compartment 14 to open the collection compartment to allow waste to drop into the compartment from the shovel area, and thereafter to close the compartment to retain the waste. This trap door serves two purposes. It holds the internal bag frame inside the unit. It also closes off the body cavity, keeping the collected waste from falling back into the shovel mechanism. This user can then continue to collect waste items and store them behind the trap door until the bag inside the body cavity is full.

A shovel actuator handle 12 is attached to the compartment 14 and configured to slide within guide 13. The handle 12 is connected to an actuator cord 20, with a distal end of the cord attached to the movable shovel 18. The movable shovel 18 is attached to the housing 14 with pivot pins 16. The pins are inserted through boreholes in the housing 14 and allow pivoting movement of the shovel 18 about the pins. Other attachment hardware, such as but not limited to, leaf springs, torsion springs, tension springs, and the like may be employed to provide a movable shovel assembly.

In operation, the actuation handle 12 is operated by a user of the animal waste collection device to open the shovel 18, and the device 10 is positioned above the animal waste to be collected. The shovel is manipulated by the handle 12 to close the shovel 18 about the waste, and the entire device is inverted. At this time, the user will manipulate the trap door 15 to open to allow waste to transfer into the internal collection bag. FIG. 3 illustrates the device 10 with the shovel 18 in the open configuration and the trap door 15 opened.

An exemplary alternate embodiment of an animal waste collection device 50 is illustrated in FIGS. 4-9C. The device 50 includes an elongated chassis structure 54 defining a waste storage compartment, capped at the top with a carrying handle 51. A disposable animal waste collection bag 80 (FIGS. 9A-9C) is installed inside the waste storage compartment, with the open end of the bag folded over the open end of the waste storage compartment and held tight around the open end by a rubber band or a clip 82 (FIG. 9B).

The device 50 further includes a shovel assembly, which in this embodiment includes opposed shovels 72, 74 mounted for pivoting movement about hinge pins 60 passed through the compartment chassis 54. A shovel actuator handle 52 is mounted for sliding movement within the handle 51, and is attached to the shovels or claws by actuator guide 53, which may be a cord or a rigid member. The user applies a squeezing pressure between the guide 52 and the handle 51, to manipulate the shovels 72, 74 to the opened position shown in FIGS. 5 and 6. The squeezing pressure lifts the actuator guide, and causes the shovels to pivot to the open condition. Springs may be attached to the shovels, e.g. at the pins 60, to bias the shovels to the closed position. Other attachment hardware, such as but not limited to, leaf springs, torsion springs, tension springs, and the like may be employed, as long as the functionality and purpose of the shovels are maintained.

When the user of the animal waste collection device applies a force at actuator guide 52 to open the shovels 72, 74, the shovels pivot about the respective pins 60 to an open position to allow for collection of waste. Once released and allowed to return to a closed position, the edges of the shovels 72, 74 are juxtaposed in an essentially face-to-face relationship. Thus, any waste between the collection shovels 72, 74 can be directed to pass through the trap door 55A, 55B (FIG. 8) and be collected in a bag 80.

Figure 9A:
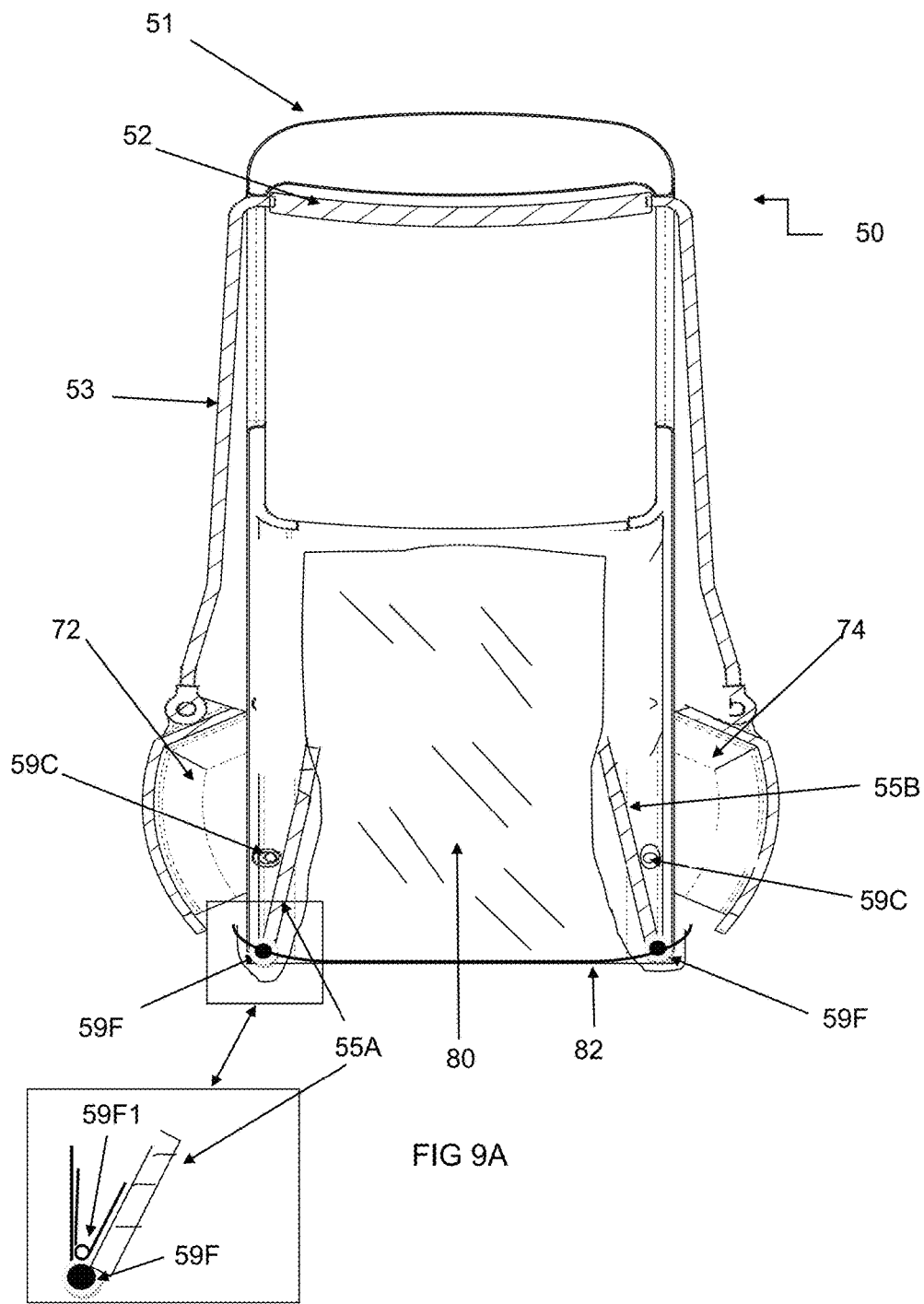
FIG. 9A is a schematic cross-sectional rear view of the device of FIG. 4, showing a collection bag fitted into the collection chamber of the device, with the open end of the bag fitted over the end of the device with the trap doors and shovels in the opened configuration.
Figure 9B:
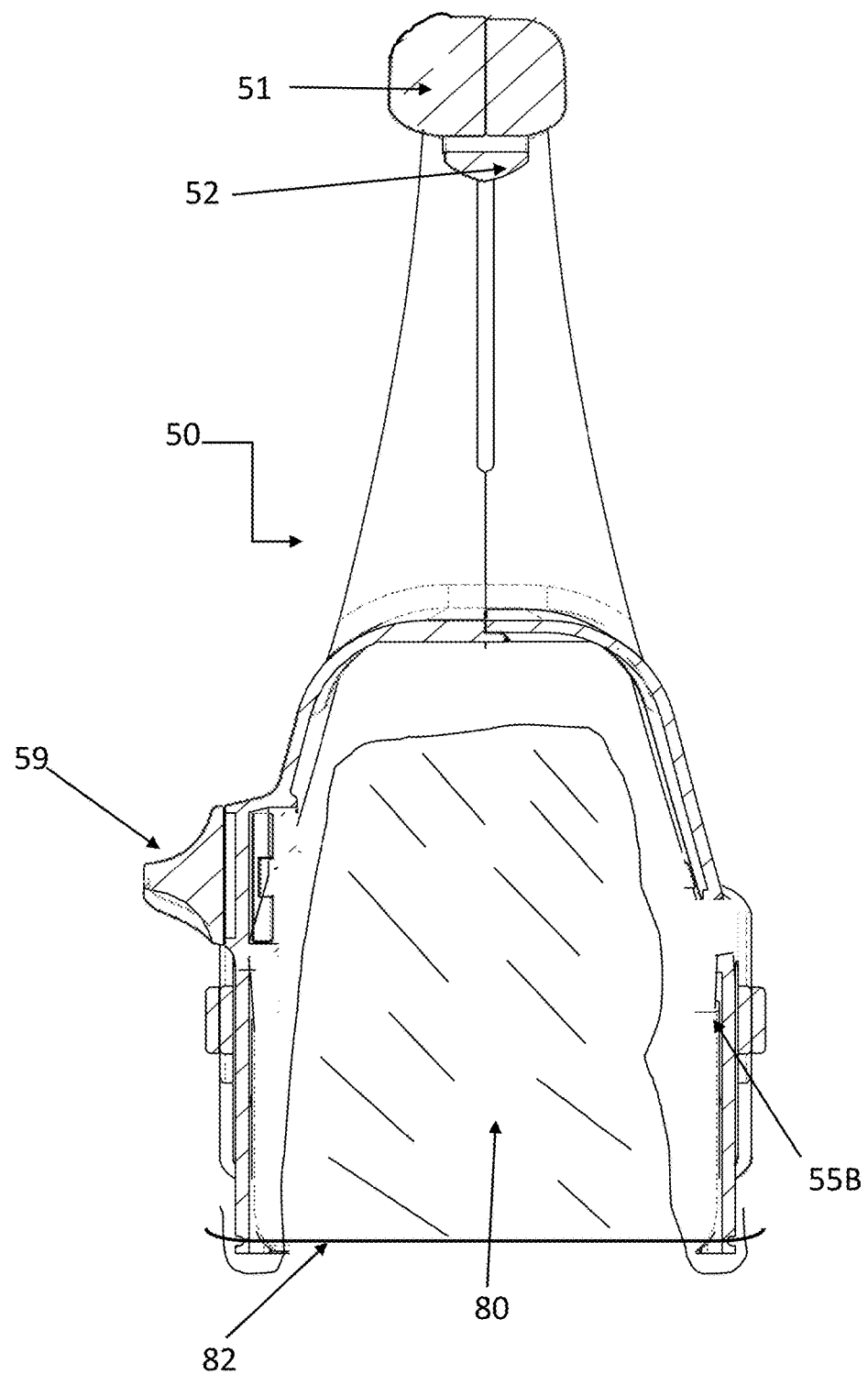
FIG. 9B is a schematic cross-sectional side view of the device as in FIG. 9A.
Figure 9C:
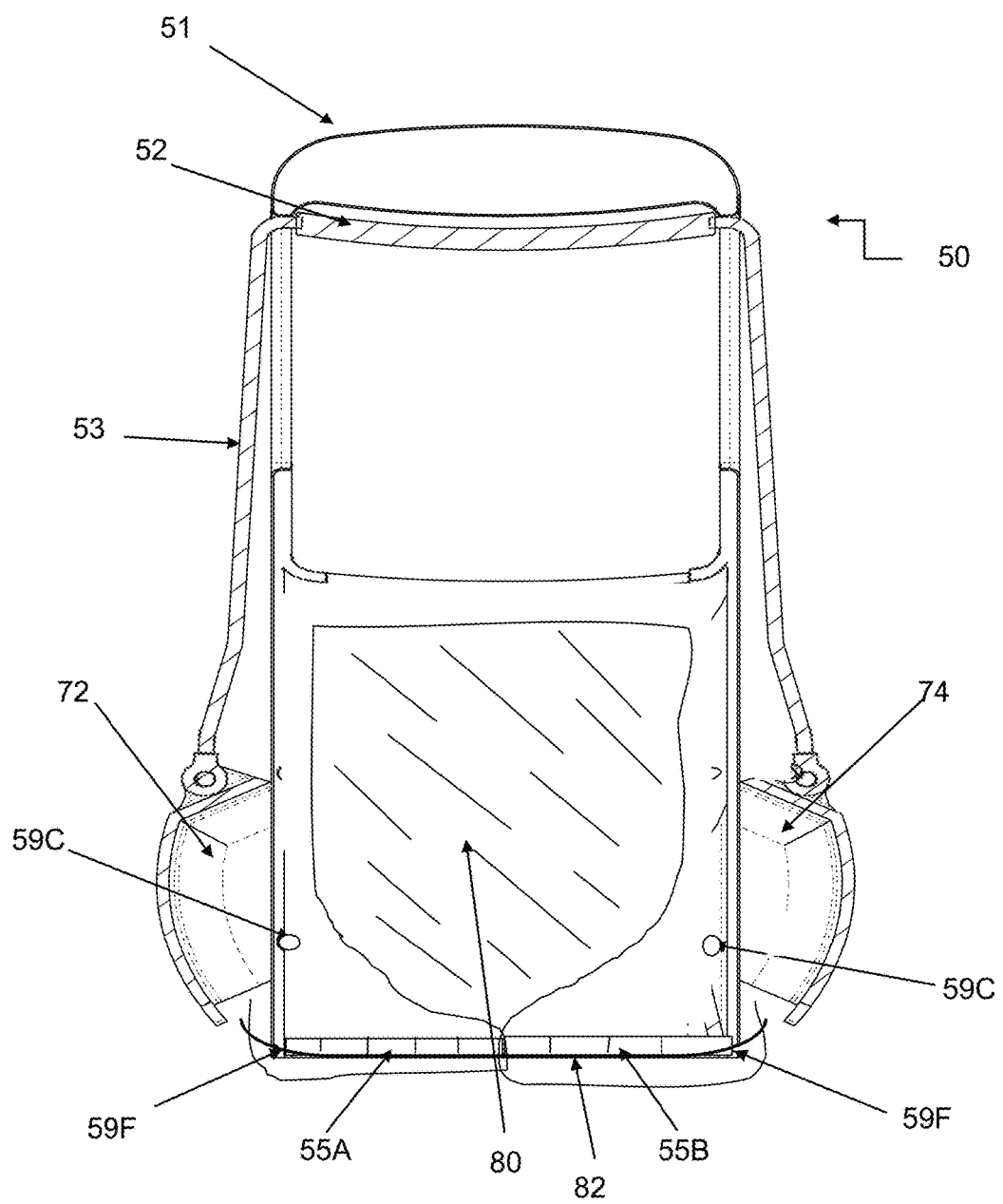
FIG. 9C is a schematic cross-sectional view of the device with an internal bag fitted as in FIG. 9A, but with the trap doors in the door closed position to pinch closed the collection bag.

The top edges of the bag 80 will extend out over the edges of the open end of the chassis structure, but under the claws of the shovel assembly. The bag may be held in place with a band or a clip. This will prevent the edges of the chassis structure from becoming contaminated. When the trap doors are open, the bag is open to receive the waste. FIG. 9B shows the internal bag's position inside the unit. FIG. 9C shows the trap doors closed over the internal bag 80 when collection is not taking place. The trap doors close to pinch the internal bag closed thus sealing the contents inside the unit and reducing the chance of spilling or unwanted odors.

To collect an animal waste specimen, the specimen may be covered by a small square of paper to protect the shovels 72, 74 from contamination. The trap doors 55A, 55B may be opened by actuation of the knob 59. As the actuation handle 52 is operated by the user of the animal waste collection device, and the shovels are manipulated to the opened condition, the device is positioned over the waste specimen. The actuator guide 52 is released, so that the shovels close over the waste specimen. The user then inverts the entire device and manipulates the trap door actuator knob 59 to the open position to open the trap doors (if not already open) and allow waste to transfer, by gravity, into the internal collection bag 80.

Figure 7:
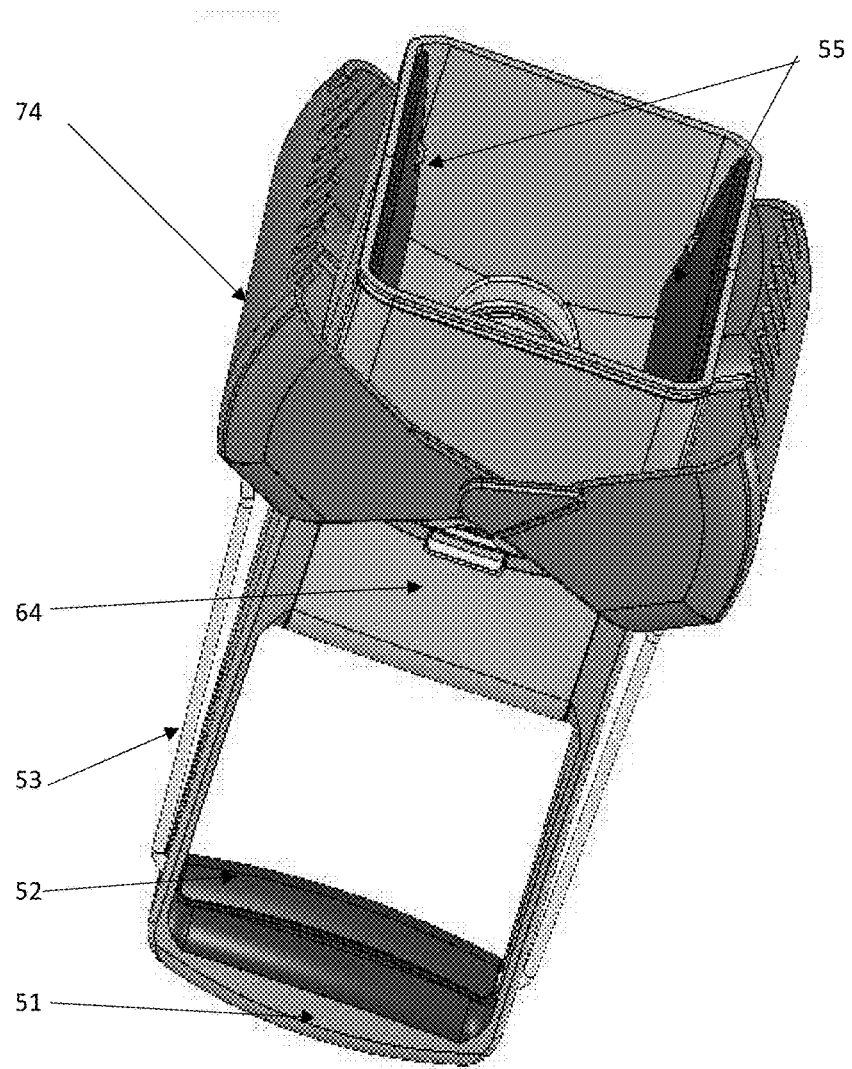
FIG. 7 is a schematic inverted isometric view of the device of FIG. 4, depicting the opened trap doors ready to accept the collected waste items.

FIG. 7 illustrates the device 50 in an inverted position, with the shovels 72, 74 and the trap doors in the respective opened positions. Once the waste has transferred through the trap doors into the collection bag 80, the knob 59 is turned to close the trap doors, which also traps or pinches the collection bag 80 between the doors, serving to close the bag, as shown in FIG. 9C.

Figure 8:
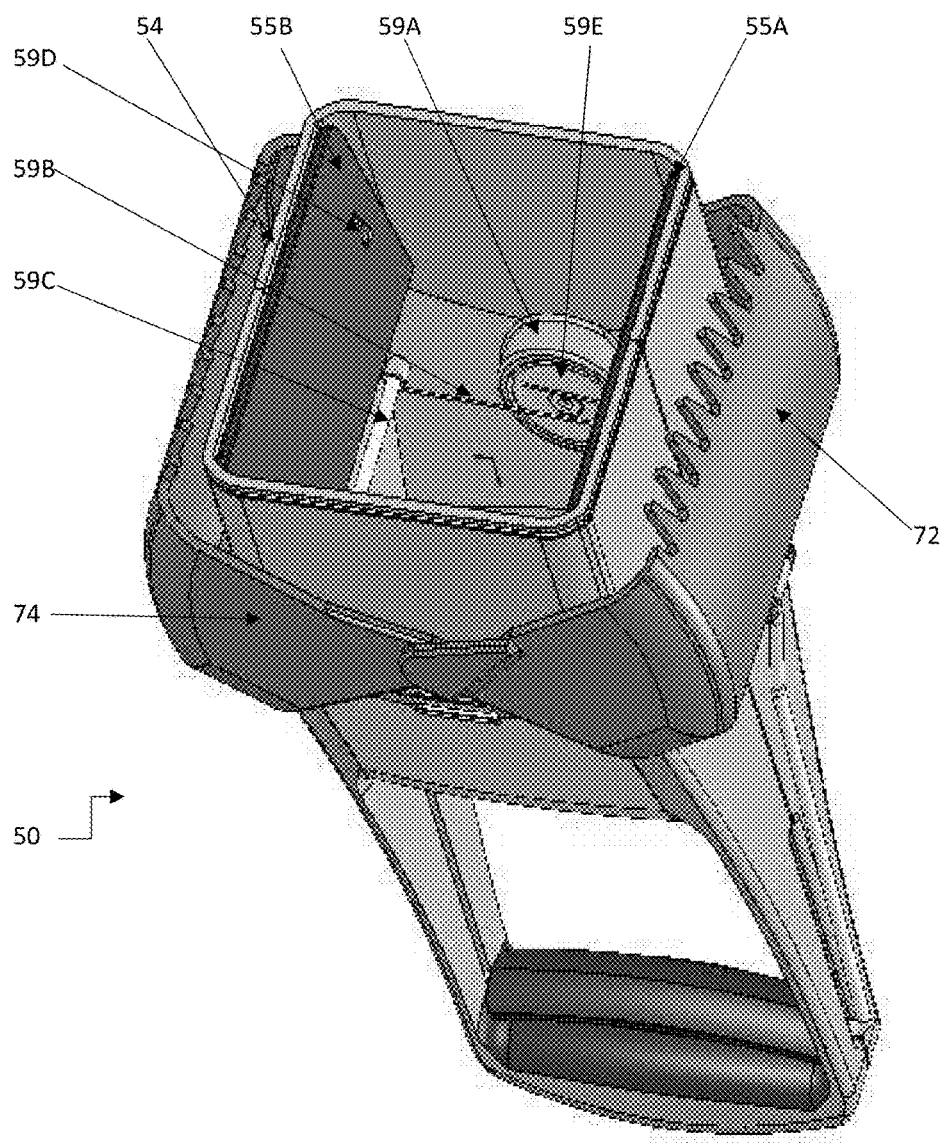
FIG. 8 is a schematic inverted isometric view of the device of FIG. 4 showing an exemplary embodiment of the trap door opening mechanism.

FIG. 8 illustrates the mechanism to open the trap doors 55A, 55B in further detail. The actuator knob 59 is connected by an axle 59E to a wheel-like structure or member 59A on the interior of the chassis 54. As the knob is turned, the wheel 59A also turns. For each trap door, an end of a wire or cable 59B is attached to the member 59A. The wire or cable 59B is passed around a post 59C, and the distal end is attached to a clear 59D on the interior surface of the trap door. Each trap door is hinged to the chassis by hinge diagrammatically indicated at 59F (FIG. 9A), and is spring-biased to the closed position. Torsion springs may be used for this purpose, as well as other types of springs or bias elements, diagrammatically indicated as 59F1 (FIG. 9A). These torsion springs may be integrated with the hinges, e.g. mounted on hinge pins or axles. As the knob 59 is turned from the closed position to the opened position, the wheel 59A turns and pulls on the wires or cables 59B, pulling the trap doors upwardly to the opened position shown in FIGS. 8 and 9A. When the user moves the control knob 59 from the open position to the closed position, the doors rotate about their hinges to the closed position, by action of the springs. The springs may be mounted on the hinges, and are compressed by the trap doors when moved to the open position. The springs act on the doors when the knob 59 is moved from the closed to the open position. The trap doors have two states, open and closed. The springs 59F1 provide a bias force, tending to press the doors to the closed state. An over-center cam function provided by the wheel 59A and knob 59 cause the springs to hold the doors open when the knob is turned to the "open" position.

Figure 6:
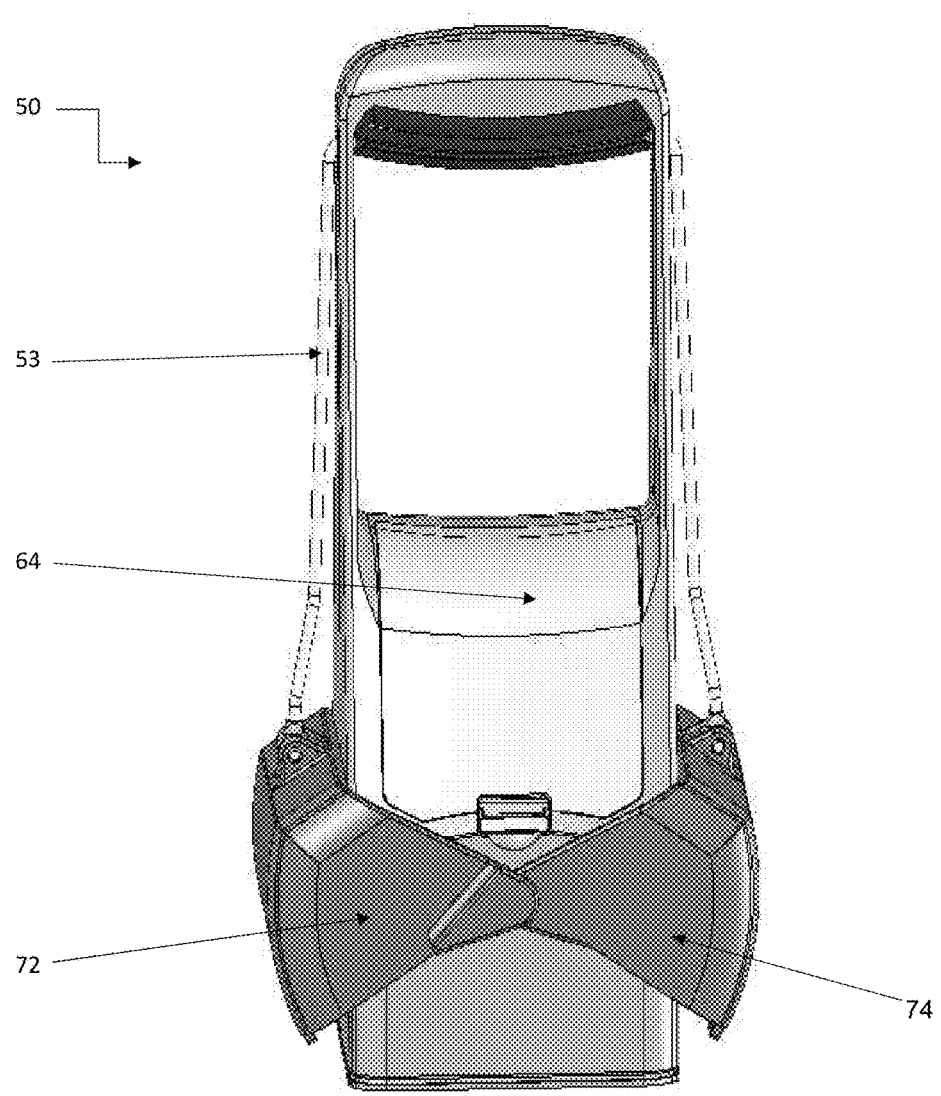
FIG. 6 is a schematic rear-view illustration of the device of FIG. 4, depicting the waste removal trap door.

The device 50 may also include a hinged rear door 64, as shown in FIG. 6, on the chassis 54 for removal of a waste bag from the collection compartment. This allows the bag to be removed from the unit without the user touching the edges of the bag that may have come in contact with the waste. In other embodiments, the trap door may be omitted, and the waste bag removed from the open end of the collection compartment, after opening the shovels 72, 74 and the trap doors 55A, 55B.

The materials of the collection device can comprise any suitable, washable, durable material. For example, and in no way limiting, parts of the collection device can be formed from a plastic material, e.g. by injection molding, a metallic material, naturally occurring materials including wood, and combinations thereof. These materials are merely exemplary and are not intended to limit the invention in any manner. The specimen collection bags are already well known, and made of a plastic material.

An exemplary embodiment of the device of FIGS. 4-9C may have a height dimension from shovel to top handle of about ten inches. The internal chamber may have a height of five inches. The front and back face of the unit may have a width of four and one-half inches, and sides which are three and one-half inches deep. The exemplary unit is therefore suitably sized for hand-held use.

Therefore, embodiments of this invention may provide a convenient, neat and easy solution for the portable collection of animal waste. Embodiments of this invention may also overcome the above-noted deficiencies of other known devices and provides previously unavailable ease of sanitary transport of animal waste.

Although the foregoing has been a description and illustration of specific embodiments of the subject matter, various modifications and changes thereto can be made by persons skilled in the art without departing from the scope and spirit of the invention.

What is claimed is:

1. A hand-held animal waste collection device, wherein multiple collections of animal waste are stored in an internal chamber, comprising:
   an elongated chassis defining a collection chamber having an open end;
   a user-actuated pick up device comprising a movable shovel assembly mounted at the open end, and configured to have a closed position in which the open end is closed by the shovel assembly, and an open position in which the open end is opened, the shovel assembly comprising one or more moveable shovels configured to pick up an animal waste specimen;
   at least one trap door movable by the user between an opened position and a closed position located inside the collection chamber above the shovel assembly, the at least one trap door configured to close the collection chamber in the closed position, and to open the collection chamber to entry of the animal waste specimen collected through the open end with the shovel assembly in the open position; and
   wherein once the specimen is collected, the device may be inverted to allow the waste to proceed by gravity force from the pick-up device, past the at least one opened trap door and into the collection chamber, and the user may thereafter actuate the trap door to move the trap door to the closed position to close the collection chamber.

2. The device of claim 1, further comprising:
   an internal bag positioned within the collection chamber and having a bag opening held open at the collection chamber open end, the bag for storing collected pet waste.

3. The device of claim 2, wherein:
   the chassis includes a second end distal from the open end, and
   a removable cap is attached to the second end, the cap removable by the user to extricate the bag and allow the user to touch the portion of the bag that has not been in contact with the animal waste.

4. The device of claim 2, wherein the internal collection bag is positioned within the collection chamber such that an edge or edges of the at least one trap door contacts external surfaces of the bag to pinch the bag closed as the at least one trap door is moved by the user from the opened position to the closed position.

5. The device of claim 2, wherein:
   the chassis includes a second end distal from the open end, and
   the chassis includes a door at or adjacent the second end, the door openable or removable by the user to extricate the bag and allow the user to touch the portion of the bag that has not been in contact with the animal waste.

6. The device of claim 1, wherein:
   the chassis includes a second end distal from the open end, and
   the second end has a protruding grip handle with a hand opening for the user's hand;
   the pick up device activated by an actuator disposed within the hand opening, and positioned for gripping by the user in a squeezing motion so as to pull the actuator toward a portion of the grip handle, the actuator connected to each of the at least one shovel by a linkage.

7. The device of claim 6, wherein:
   the shovel assembly comprises first and second opposed shovels mounted for pivoting movement, wherein in the closed position forward edges of the opposed shovels meet together, the actuator connected to each of the first and second shovels to exert a pulling force on each shovel when the actuator is pulled toward the handle portion by the user.

8. The device of claim 6, wherein the linkage is a cord or wire.

9. The device of claim 1, wherein:
   the at least one trap door comprises first and second opposed doors hingedly mounted to opposing sides of the chassis within the chamber;
   the device further comprising a movable actuator knob mounted to an exterior surface of the chassis, and a linkage between the knob and the first and second doors to move the doors from the closed position to the open position.

10. The device of claim 9, wherein the knob is rotatable from a closed position to an open position, and the linkage includes a rotatable structure within the chamber and connected to the knob so that the structure rotates with the knob, and respective first and second lines connected between the structure and a respective first or second door, the lines and the structure arranged so that a pulling force is applied to the respective first and second doors to pull the doors to open downwardly toward the open end of the chassis as the knob is turned from the closed to the open position.

11. An animal waste collection device, wherein multiple collections of animal waste are stored in an internal chamber, comprising:
   an elongated chassis defining a collection chamber having an open first end and an opposed second end, the chassis includes a second end distal from the open end;
   a generally U-shaped protruding grip handle with a hand opening for the user's hand;
   a user-actuated pick up device comprising a movable shovel assembly mounted at the open end, and configured to have a closed position in which the open end is closed by the shovel assembly, and an open position in which the open end is opened, the shovel assembly comprising first and second opposed shovels;
   an actuator disposed within the hand opening, and positioned for gripping by the user in a squeezing motion so as to pull the actuator toward a portion of the grip handle, the actuator connected to each of the first and second shovels by a linkage;
   first and second opposed doors hingedly mounted to opposing sides of the chassis within the chamber, the doors movable by the user between an opened position and a closed position, the doors configured to close the collection chamber in the closed position, and to open the collection chamber to entry of an animal waste specimen collected through the open end with the shovel assembly in the open position; and wherein once the specimen is collected, the device may be inverted to allow the waste to proceed by gravity force from the pick-up device, past the open trap door and into the collection chamber.

12. The device of claim 11, wherein the first and second opposed shovels are mounted for pivoting movement, wherein in the closed position forward edges of the opposed shovels meet, the actuator connected to each of the first and second shovels to exert a pulling force on each shovel when the actuator is pulled toward the handle portion by the user to move the shovels to the open position.

13. The device of claim 11, further comprising a movable actuator knob mounted to an exterior surface of the chassis, and a linkage between the knob and the first and second trap doors to move the doors from the closed position to the open position.

14. The device of claim 11, wherein the chassis and the handle are formed as a unitary structure, and the chassis, handle and first and second shovels are formed from one or more plastic materials.

15. The device of claim 11, further comprising:
an internal bag configured for positioning within the collection chamber and having a bag opening held open at the collection chamber open end, the bag for storing collected pet waste.

16. The device of claim 15, wherein the trap doors are configured to pinch the bag closed when the doors move to the closed position.

17. The device of claim 15, wherein:
the chassis includes a door at or adjacent the second end, the door openable or removable by the user to extricate the bag and allow the user to touch the portion of the bag that has not been in contact with the animal waste.

* * * * *